US007289470B2

(12) United States Patent
Shimazaki

(10) Patent No.: US 7,289,470 B2
(45) Date of Patent: Oct. 30, 2007

(54) METHOD AND APPARATUS OF PERFORMING HANDOFF

(75) Inventor: Yoshihito Shimazaki, Kanagawa (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 1028 days.

(21) Appl. No.: 10/268,101

(22) Filed: Oct. 10, 2002

(65) Prior Publication Data
US 2003/0081570 A1  May 1, 2003

(30) Foreign Application Priority Data
Oct. 11, 2001  (JP) .............................. 2001-313591

(51) Int. Cl.
*H04Q 7/00* (2006.01)
*H04Q 7/20* (2006.01)
(52) U.S. Cl. ..................................... 370/331; 455/436
(58) Field of Classification Search ............... 370/331, 370/334, 335, 332; 455/436, 437, 442
See application file for complete search history.

(56) References Cited

U.S. PATENT DOCUMENTS

| 5,101,501 | A | * | 3/1992 | Gilhousen et al. .......... 455/442 |
| 5,483,668 | A | * | 1/1996 | Malkamaki et al. ........ 455/437 |
| 5,507,035 | A | * | 4/1996 | Bantz et al. ................. 455/133 |
| 6,611,675 | B1 | * | 8/2003 | Salonen et al. ............... 455/69 |
| 6,678,249 | B2 | * | 1/2004 | Toskala et al. ............. 370/236 |
| 6,708,030 | B1 | * | 3/2004 | Horikawa .................... 455/436 |
| 2001/0001762 | A1 | * | 5/2001 | Frodigh et al. ............. 455/436 |
| 2004/0162021 | A1 | * | 8/2004 | Seki et al. ..................... 455/39 |

FOREIGN PATENT DOCUMENTS

WO  WO 00/51265  8/2000

OTHER PUBLICATIONS

"3rd Generation Partnership Project: Technical Specification Group Radio Access Network; Physical layer procedures (FDD) (Release 1999)", 3GGP TS 25.214 v3.8.0, (Sep. 2001).

* cited by examiner

*Primary Examiner*—Hassan Kizou
*Assistant Examiner*—Betty Lee
(74) *Attorney, Agent, or Firm*—Volentine & Whitt, P.L.L.C.

(57) ABSTRACT

In a mobile communications system, a mobile station communicates with a first base station operating at a first antenna specific weight factor. While the mobile station is both in a coverage area of the first base station and a coverage area of a second base station, the mobile station transmits a control signal to the second base station which causes the second base station to operate at a second antenna specific weight factor which is the same as the first antenna specific weight factor. The mobile station then communicates with the second base station, operating at the second antenna specific weight factor, to complete a handoff operation.

16 Claims, 7 Drawing Sheets

METHOD AND APPARATUS OF PERFORMING HANDOFF

BACKGROUND OF THE INVENTION

1. Field of the Invention

The present invention relates, in general, to wireless communication systems and, more particularly, to the handoff of a mobile station from a first base station to a second base station in code division multiple access (CDMA) communication systems.

This is a counterpart of and claims priority to Japanese patent application Serial Number 313591/2001, filed Oct. 11, 2001, the subject matter of which is incorporated herein by reference.

2. Description of the Related Art

Diversity transmission in a CDMA system is disclosed in "Physical channels and mapping of transport channels onto physical channels (FDD)" 3GPP (3rd Generation Partnership Project). A closed loop mode diversity transmission is disclosed which controls a transmitting carrier phase of a base station (Node B) using feedback information output from a mobile station (UE: User Equipment). Diversity is a generic name for methods of receiving a plurality of same signals under the several differential requirements and selecting the signal meeting a certain requirement or communicating condition. Diversity transmission generates a plurality of carrier waves each of which has the differential wave modulated using the same modulation signal, and transmits the generated carrier waves to a plurality of paths having individual fading.

However, the above document does not disclose a method of diversity transmission among two or more base stations, when the mobile station is in the handoff situation from one base station to another base station. The mobile station does not individually direct the selection of diversity transmission of one base station to be communicated next, when the mobile station is communicating with the other base station.

SUMMARY OF THE INVENTION

According to one aspect of the present invention, there is provided a method for controlling a handoff operation in a mobile communications system, comprising communicating between a mobile station and a first base station, wherein the first base station is operating at a first antenna specific weight factor, transmitting, while the mobile station is in a coverage area of the first base station and a coverage area of a second base station, a control signal from the mobile station to the second base station which causes the second base station to operate at a second antenna specific weight factor which is the same as the first antenna specific weight factor, and communicating between the mobile station and the second base station, wherein the second base station is operating at the second antenna specific weight factor.

The novel features of the invention will more fully appear from the following detailed description, appended claims and the accompanying drawings.

DETAILED DESCRIPTION OF THE PREFERRED EMBODIMENTS

Figure 1:
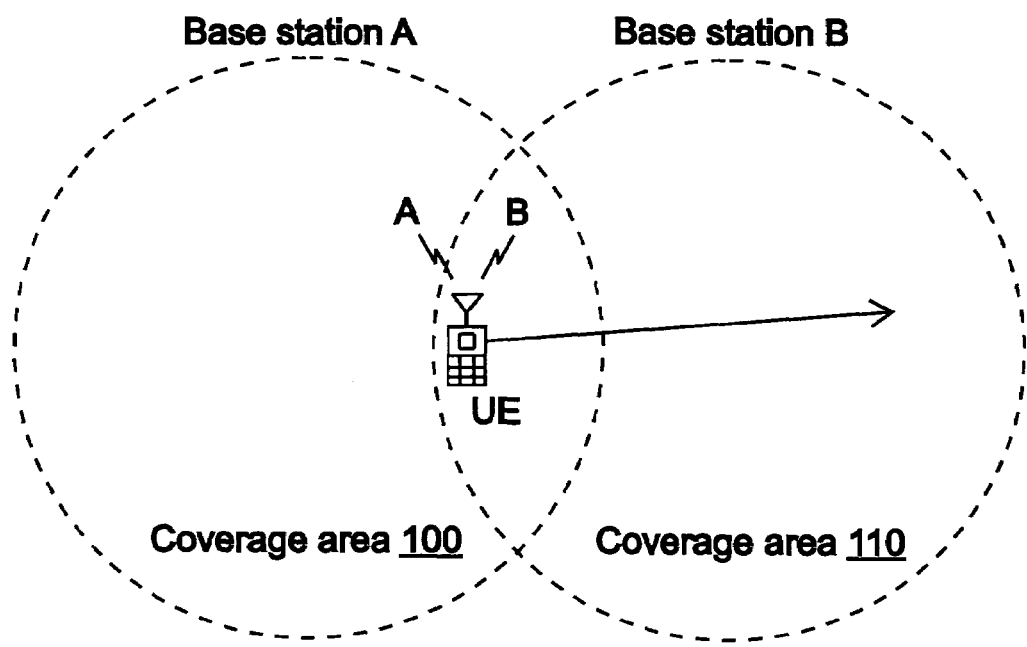
FIG. 1 is a block diagram showing the relationship between two base stations and a mobile station.

At first, the relationship between two base stations A, B (Node B) and a mobile station (UE) will be described with reference to FIG. 1. As shown FIG. 1, the first base station A has a coverage area 100, and the second base station B has a coverage area 110. A part of the coverage area 100 and a part of the coverage area 110 overlap each other. The mobile station (UE) is in the overlapping area, and is about to leave the coverage area 100 of the first base station A. Each of the base stations has at least two antennas which output two respective sending signals which are used to communicate with the mobile station (UE). The mobile station combines the plurality of signals received from the plurality of antennas, treats the combined signal as the sending signal output from the based station, and decodes the combined signal.

Next, the preferred embodiments of the present invention will be described. However, the invention is not limited to the specific embodiments. Moreover, not all the combinations of the characteristics of the present invention described in the embodiments are essential to the present invention.

Figure 2:
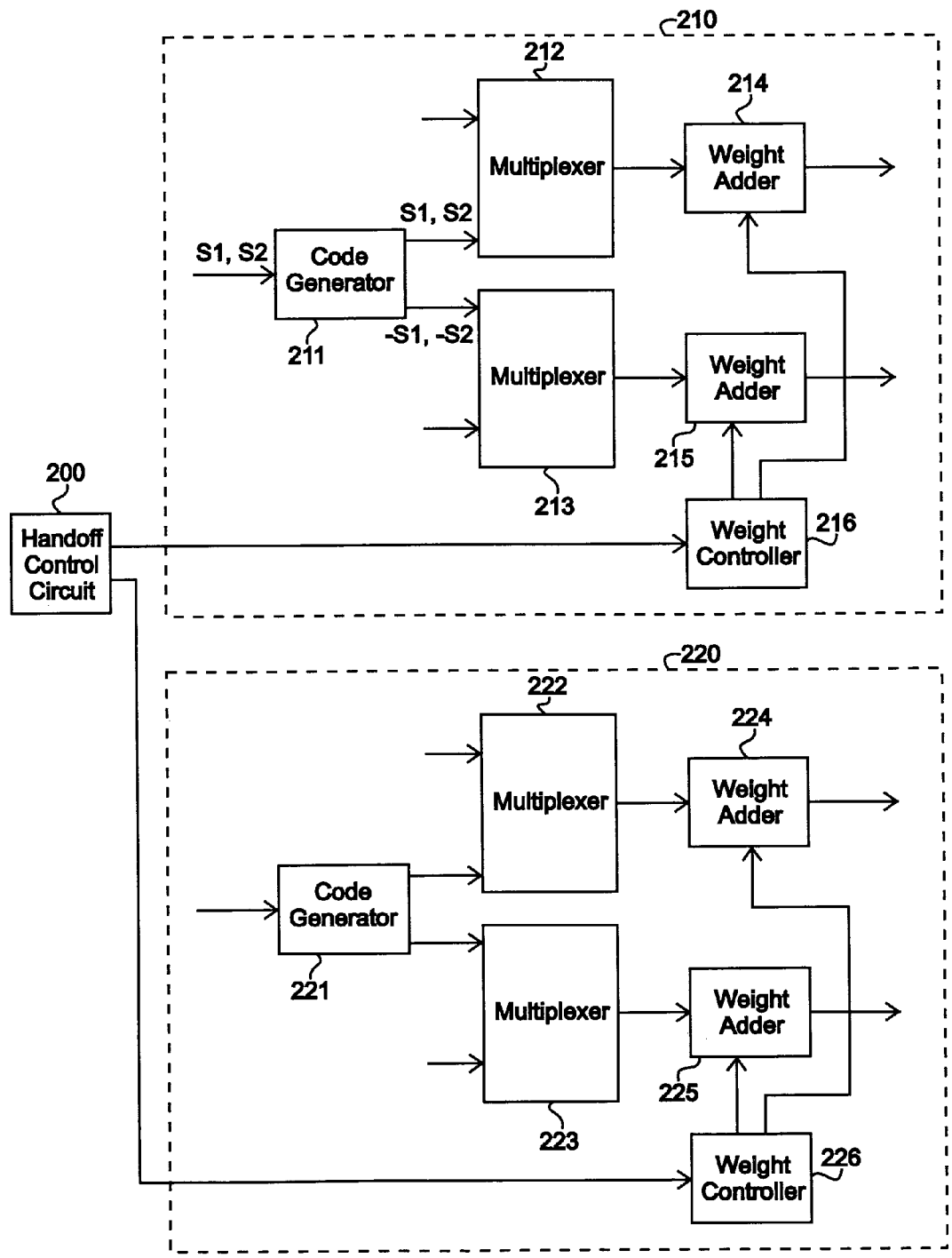
FIG. 2 is a block diagram showing an apparatus for performing a handoff according to a first preferred embodiment of the present invention.
Figure 3:
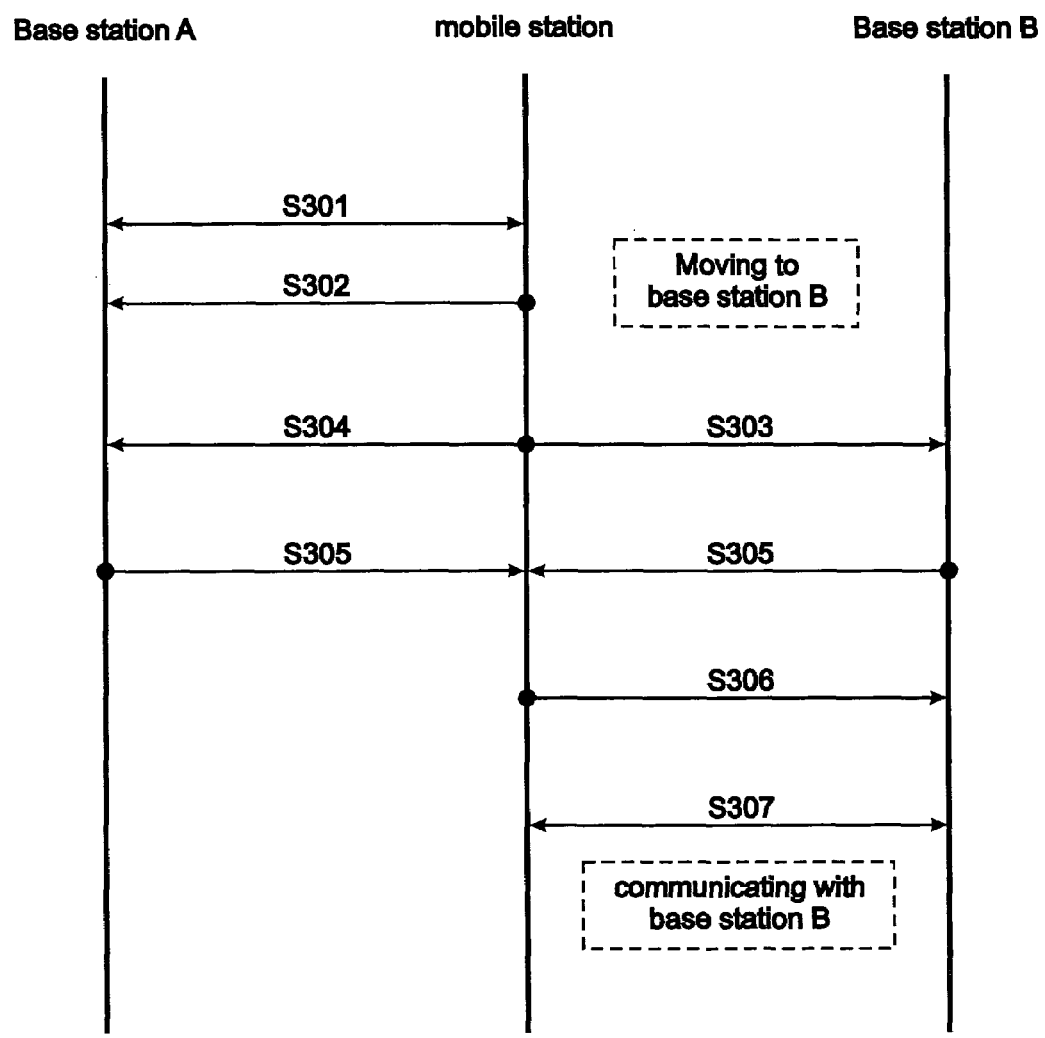
FIG. 3 is a ladder diagram showing a method for performing a handoff according to the first preferred embodiment of the present invention.

A method and apparatus for performing a handoff in a wireless communication system according to a first preferred embodiment of the present invention will be described with reference to FIGS. 2-3. FIG. 2 is a circuit diagram showing an apparatus for performing a handoff according to the first preferred embodiment of the present invention. FIG. 3 is a ladder diagram showing a method for performing a handoff according to the first preferred embodiment of the present invention.

First, the apparatus for performing a handoff according to the first preferred embodiment of the present invention will be described with reference to FIG. 2. FIG. 2 shows a handoff control circuit 200 of the mobile station, a transmitting circuit 210 of the base station A and a transmitting circuit 220 of the base station B.

For example, the handoff control circuit 200 of the mobile station controls a handoff by comparing power levels of the signals which are transmitted from the two base stations to the mobile station and then selecting the one signal which has the larger power level. The handoff control circuit 200 also outputs a reset signal to the communicating base station. The reset signal causes an antenna specific weight factor of the communicating base station to reset to initial value. The antenna specific weight factor is complex value signal (i.e. $w_i = a_i + jb_i$). Then, the handoff control circuit 200 also outputs the reset signal to the base station to be communicated next, in order to reset the antenna specific weight factor to an initial value. Therefore, the antenna weight specific factor of the communicating base station and the antenna weight specific factor of the to be communicated next base station become the same. The reset signal is sent to the base stations, using a Dedicated Physical Control Channel (DPCCH) of a Dedicated Physical Channel (DPCH) in upperlink.

The transmitting circuit 210 of the base station A comprises a code generator 211 for diversity transmission, multiplexers 212, 213, weight adders 214, 215 and a weight controller 216. The base station A has two antennas (a first antenna and a second antenna) and two transmitting paths (a transmitting path A and a transmitting path B) corresponding to each antenna. The multiplexer 212 and the weight adder 214 are used for the transmitting path A corresponding to the first antenna. The multiplexer 213 and the weight adder 215 are used for the transmitting path B corresponding to the second antenna. The base station A sends a Common Pilot Channel (CPICH) to the mobile station, using the two antennas of the same phases. The base station A spreads the Common Pilot Channel (CPICH) to be sent by the two antennas, using the same spreading code. On the other hand, the transmitting circuit 220 of the base station B comprises a code generator 221 for transmitting diversity, a multiplexer 222 for transmitting path A, a weight adder 224 for transmitting path A, a multiplexer 223 for transmitting path B, a weight adder 225 for transmitting path B and a weight controller 226, in the same way as the transmitting circuit 210 of the base station A.

The transmitting circuit 210 of the base station A will be explained next. The explanation of the transmitting circuit 220 is omitted, because the composition of the transmitting circuit 220 is almost the same as that of the transmitting circuit 210.

The code generator 211 for diversity transmission is input with two pilot symbols S1, S2 from the outside of the transmit circuit 210 of the base station A. The code generator 211 for diversity transmission reverses the signs of the pilot symbols S1, S2 and generates the reversed pilot symbols −S1, −S2. The code generator 211 for diversity transmission outputs the pilot symbols S1, S2 to the multiplexer 212 for transmitting path A and the reversed pilot symbols −S1, −S2 to the multiplexer 213 for transmitting path B. The pilot symbol is used for orthogonalization of the Common Pilot Channel (CPICH) spread by the same spreading code. In other words, the pilot symbol is used to allow the mobile station distinguish between the transmitting path A and the transmitting path B.

The multiplexer 212 for transmitting path A is input with a data sequence to be sent and the pilot symbols S1, S2. The multiplexer 212 multiplies the data sequence to be sent and the pilot symbols S1, S2, and outputs the multiplication result (a first calculation result). On the other hand, the multiplexer 213 for transmitting path B is input with the data sequence to be sent and the reversed pilot symbols −S1, −S2. The multiplexer 213 multiplies the data sequence to be sent and the reversed pilot symbols −S1, −S2, and outputs the multiplication result (a second calculation result).

The weight adder 214 for the transmitting path A is input with the multiplication result which is output to the multiplexer 212 for the transmitting path A. The weight adder 214 multiplies the multiplication result by the antenna specific weight factor and generates a channel assumption value (a first sending signal). This multiplication operation is denoted as a Maximal Ratio Combining (MRC). The channel assumption value in which a phasing correlation is large is combined with a large antenna specific weight factor. On the other hand, the weight adder 215 for the transmitting path B is input with the multiplication result which is output to the multiplexer 213 for the transmitting path B. The weight adder 215 multiplies the multiplication result by the antenna specific weight factor and generates a channel assumption value (a second sending signal).

The weight controller 216 is input with a control signal (Dedicated Physical Control Channel: DPCCH) from the mobile station. The weight controller 216 controls the value of the antenna specific weight factor which is used in the weight adder 214 for the transmitting path A and the weight adder 216 for the transmitting path B based on the control signal. For example, if the weight controller 216 has a table of the values of the antenna specific weight factor, the weight controller 216 selects the antenna specific weight factor from the table based on the control signal output from the mobile station.

Next, a method for performing a handoff according to the first preferred embodiment of the present invention will be described with reference to FIG. 3.

The mobile station is in the coverage area of the base station A and is communicating with the base station A. The mobile station is moving in direction of the coverage area of the base station B (S301). The mobile station is communicating with the base station A using the most suitable pilot symbol (S302). When the mobile station enters into the control area of the base station B which is overlapping the coverage area of the base station A, the handoff controller 200 of the mobile station directs the base station B to prepare for a handoff (S303). At this time, the mobile station is directing diversity transmission of the base station A and is not directing diversity transmission of the base station B. The mobile station does not direct the transmitting diversities of the base stations A and B, individually. As such, when the mobile station directs the base station B to prepare for a handoff, the mobile station directs the base station A to let the antenna specific weight factor which is using between the mobile station and the base station A initialize (S304). Therefore, each of the antenna specific weight factors of the base stations A and B to be used becomes an initial value with each other. The mobile station is input with two signals (one is for the transmitting path A and the other is for the transmitting path B) from both of the base stations A and B, respectively (S305). When the mobile station goes into the control area of the base station B which is not overlapping the coverage area of the base station A, the mobile station selects the signal for the transmitting path A or the signal for the transmitting path B (S306) and starts to communicate with the base station B (S307).

The apparatus and method for performing a handoff according to the first preferred embodiment of the present invention have the following effects.

The first preferred embodiment of the present invention lets the antenna specific weight factor of the base station communicating with the mobile station and the antenna specific weight factor of the base station to be communicated next to be the same, before handoff. Therefore, the mobile station using the apparatus or method of the first preferred embodiment of the present invention communicates smoothly with the base station during handoff.

Figure 4:
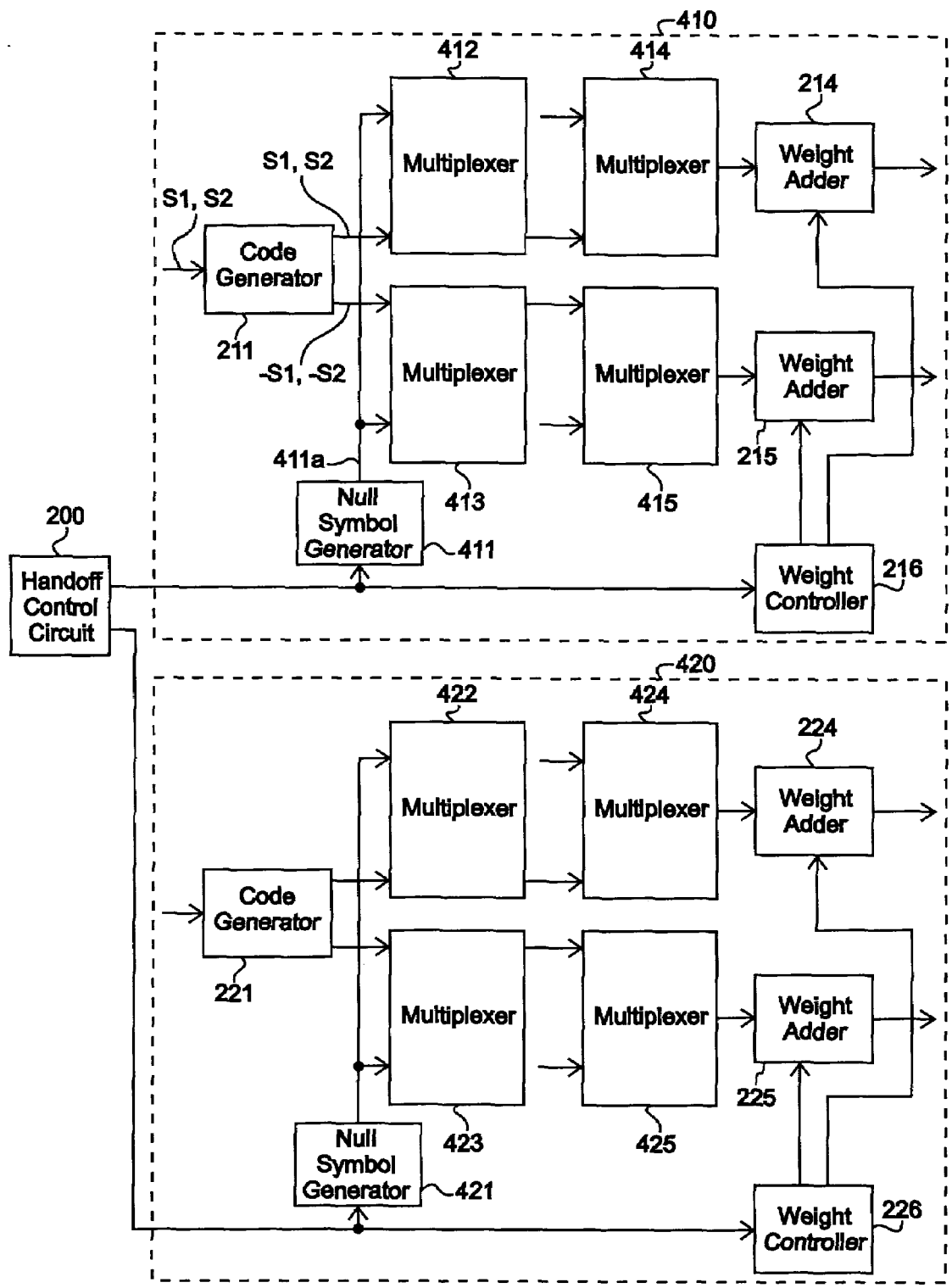
FIG. 4 is a block diagram showing an apparatus for performing a handoff according to a second preferred embodiment of the present invention.
Figure 5:
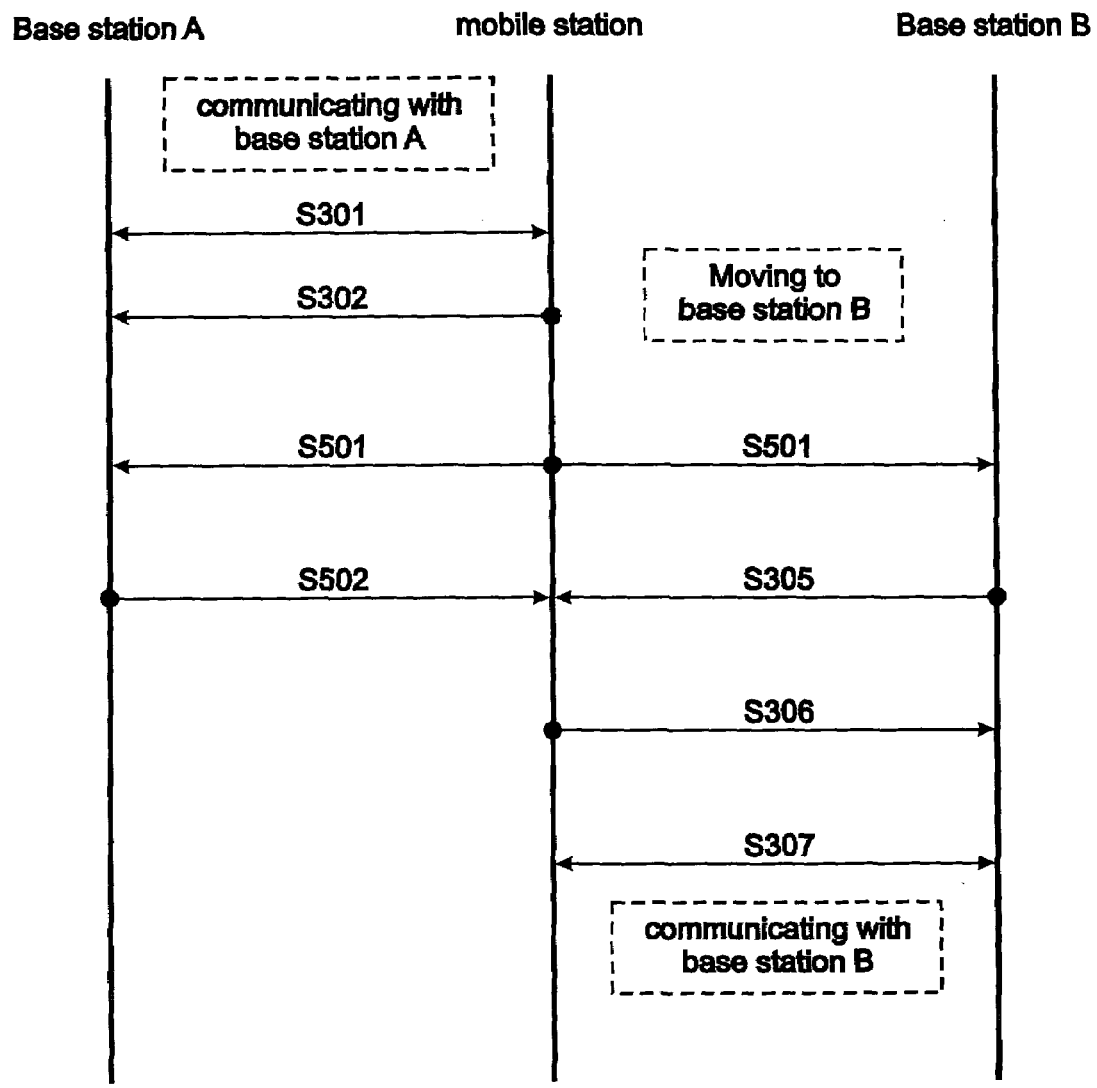
FIG. 5 is a ladder diagram showing a method for performing a handoff according to the second preferred embodiment of the present invention.

A method and apparatus for performing a handoff in a wireless communication system according to a second preferred embodiment of the present invention will be described with reference to FIGS. 4-5. FIG. 4 is a circuit diagram showing an apparatus for performing a handoff according to the second preferred embodiment of the present invention. FIG. 5 is a ladder diagram showing a method for performing a handoff according to the second preferred embodiment of the present invention. Like elements are given like or corresponding reference numerals in the first and second preferred embodiments. Thus, dual explanations of the same elements are avoided.

First, the apparatus for performing a handoff according to the second preferred embodiment of the present invention will be described with reference to FIG. 4. FIG. 4 shows a handoff control circuit 200 of the mobile station, a transmitting circuit 410 of the base station A and a transmitting circuit 420 of the base station B.

The transmitting circuit 410 of the base station A comprises a code generator 211 for diversity transmission, a null symbol generator 411, multiplexers 412, 413, 414, 415, weight adders 214, 215 and a weight controller 216. The base station A has two antennas (a first antenna and a second antenna) and two transmitting paths (a transmitting path A and a transmitting path B) corresponding to each antenna, in the same way as the base station of the first preferred embodiment. The multiplexers 412, 414 and the weight adder 214 are used for the transmitting path A corresponding to the first antenna. The multiplexers 413, 415 and the weight adder 215 are used for the transmitting path B corresponding to the second antenna.

The transmitting circuit 410 of the base station A will be explained next. The explanation of the transmitting circuit 420 is omitted, because the composition of the transmitting circuit 420 is almost same as the composition of the transmitting circuit 410.

The code generator 211 for diversity transmission is input with two pilot symbols S1, S2 from the outside of the transmit circuit 210 of the base station A. The code generator 211 for reverses the signs of the pilot symbols S1, S2 and generates the reversed pilot symbols −S1, −S2. The code generator 211 for diversity transmission outputs the pilot symbols S1, S2 to the multiplexer 412 for transmitting path A and the reversed pilot symbols −S1, −S2 to the multiplexer 413 for transmitting path B.

The null symbol generator 411 is input with a control signal (Dedicated Physical Control Channel: DPCCH) from the mobile station. The null symbol generator 411 generates a null symbol 411a when with input the control signal from the mobile station. The null symbol is a pilot symbol of which value is zero. The null symbol generator 411 outputs the null symbol 411a to the multiplexers 412, 413.

A first multiplexer 412 for transmitting path A is input with the null symbol 411a and the pilot symbols S1, S2. The multiplexer 412 usually outputs the pilot symbol S1, S2. The multiplexer 412 outputs the null symbol 411a when the null symbol 411a is input. On the other hand, a first multiplexer 413 for transmitting path B is input with the null symbol 411a and the reversed pilot symbols −S1, −S2. The multiplexer 413 usually outputs the reversed pilot symbol −S1, −S2. The multiplexer 413 outputs the null symbol 411a when the null symbol 411a is input.

A second multiplexer 414 for transmitting path A is input with a data sequence to be sent and the null symbol 411a or the pilot symbols S1, S2. The multiplexer 414 multiplies the data sequence by the pilot symbol S1, S2 or the null symbol 411a, and outputs a multiplication result (a fifth calculation result). A second multiplexer 415 for transmitting path B is input with a data sequence to be sent and the null symbol 411a or the reversed pilot symbols −S1, −S2. The multiplexer 415 multiplies the data sequence by the reversed pilot symbol −S1, −S2 or the null symbol 411a, and outputs a multiplication result (a sixth calculation result).

Next, a method for performing a handoff according to the second preferred embodiment of the present invention will be described with reference to FIG. 5.

The mobile station is in the coverage area of the base station A and is communicating with the base station A. When the mobile station performs a handoff to the base station B, the mobile station directs to generate the null symbol for the base station A and directs diversity transmission for the base station (S501). When the mobile station starts to communicate with the base station B, the mobile station does not receive diversity transmission from the base station A but the null symbol (S502). Therefore, the mobile station only receives diversity transmission of the base station B.

The apparatus and method for performing a handoff according to the second preferred embodiment of the present invention have the following effects.

The second preferred embodiment of the present invention allows the base station communicating with the mobile station to generate the null symbol instead of the antenna specific weight factor, when performing the handoff. Therefore, the mobile station using the apparatus or method of the second preferred embodiment of the present invention communicates smoothly with the base station during handoff.

In addition, the mobile station using the apparatus or method for performing handoff according to the second preferred embodiment of the present invention does not need resetting of diversity transmission which is communicating with the based station to an initialize value. Therefore, the communication quality is improved.

Figure 6:
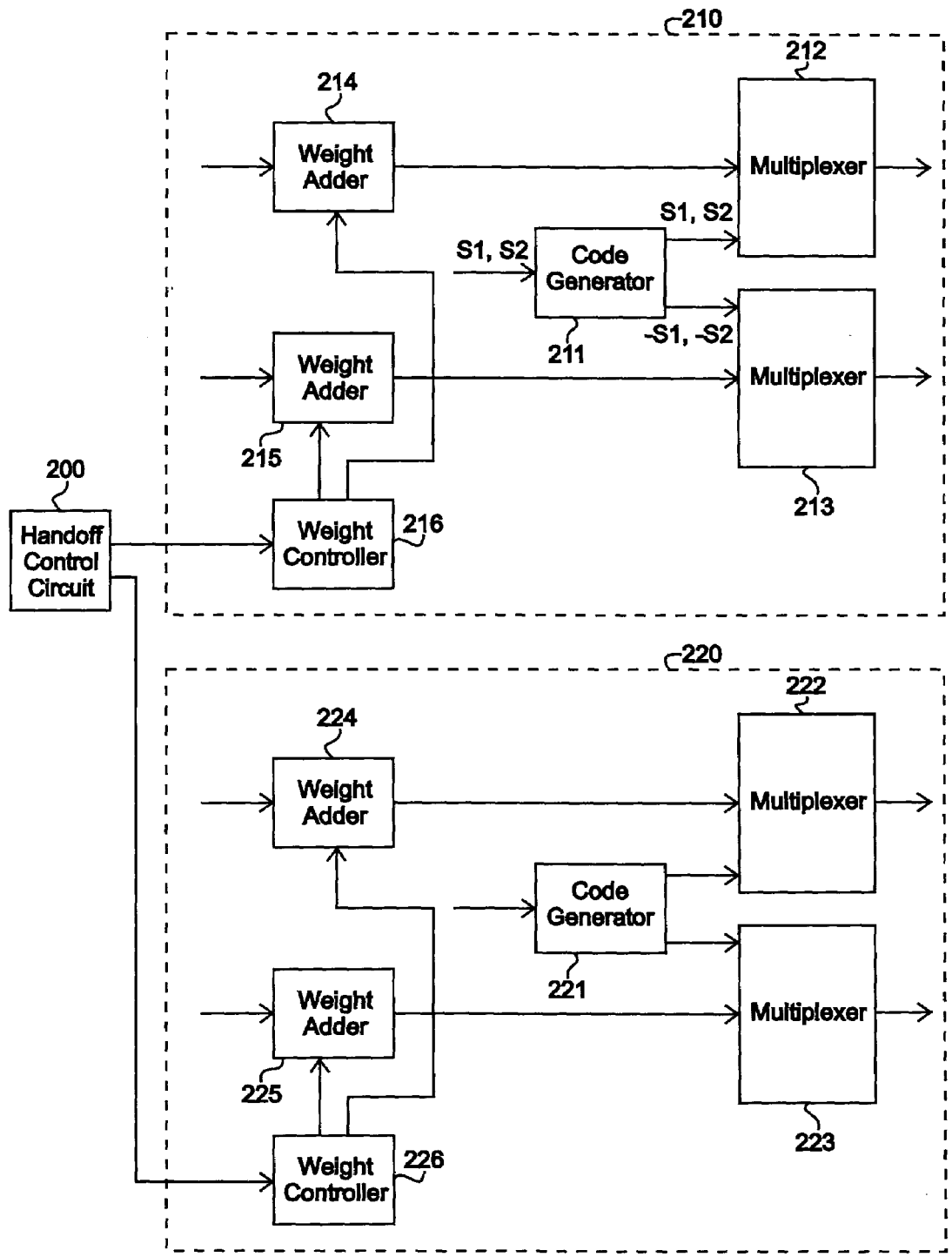
FIG. 6 is a block diagram showing an apparatus for performing a handoff according to a third preferred embodiment of the present invention.

An apparatus for performing a handoff in a wireless communication system according to a third preferred embodiment of the present invention will be described with reference to FIG. 6. FIG. 6 is a circuit diagram showing an apparatus for performing a handoff according to the third preferred embodiment of the present invention. Like elements are given like or corresponding reference numerals in the first and third preferred embodiments. Thus, dual explanations of the same elements are avoided. As shown in FIG. 2, the weight addition operation according to the first preferred embodiment of the present invention is done after the multiplication operation using a data sequence to be sent and the pilot symbol. However, the multiplication operation according to the third preferred embodiment of the present invention is done by using the pilot symbol, after the weight addition operation using a data sequence to be sent.

The weight adder 214 for the transmitting path A is input with a data sequence to be sent. The weight adder 214 multiplies the data sequence to be sent by the antenna specific weight factor and generates a first multiplication result. On the other hand, the weight adder 215 for the transmitting path B is input with the data sequence to be sent. The weight adder 215 multiplies the data sequence to be sent by the antenna specific weight factor and generates a second multiplication result.

The multiplexer 212 for transmitting path A is input with the first multiplication result and the pilot symbols S1, S2. The multiplexer 212 multiplies the first multiplication result and the pilot symbols S1, S2, and outputs a channel assumption value. On the other hand, the multiplexer 213 for transmitting path B is input with the second multiplication result and the pilot symbols −S1, −S2. The multiplexer 213 multiplies the second multiplication result and the pilot symbols −S1, −S2, and outputs a channel assumption value.

Figure 7:
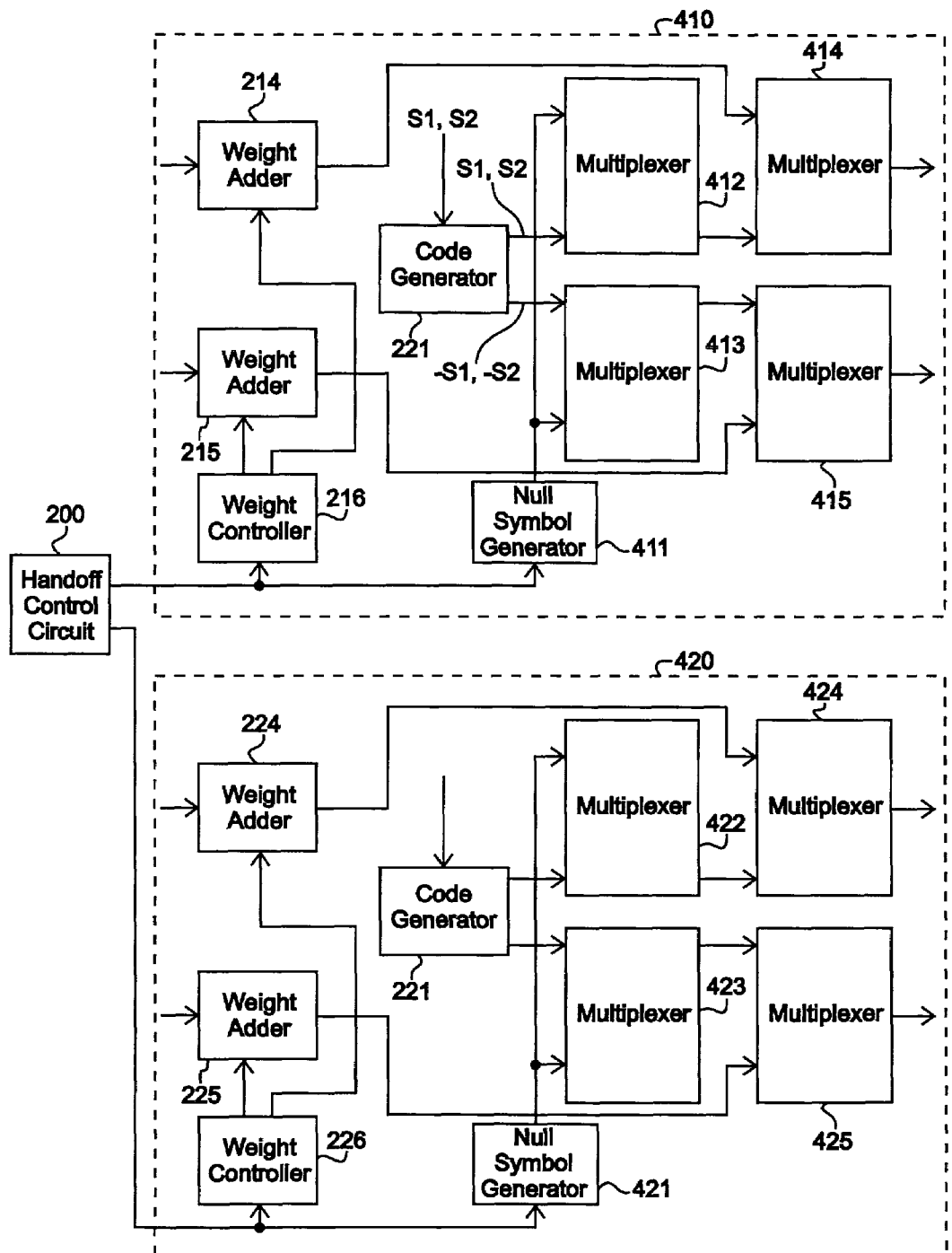
FIG. 7 is a block diagram showing an apparatus for performing a handoff according to a fourth preferred embodiment of the present invention.

An apparatus for performing a handoff in a wireless communication system according to a fourth preferred embodiment of the present invention will be described with reference to FIG. 7. FIG. 7 is a circuit diagram showing an apparatus for performing a handoff according to the fourth preferred embodiment of the present invention. Like elements are given like or corresponding reference numerals in the second, third and fourth preferred embodiments. Thus, dual explanations of the same elements are avoided. As shown in FIG. 4, the weight addition operation according to the second preferred embodiment of the present invention is done after the multiplication operation using a data sequence to be sent and the pilot symbol. However, the multiplication operation according to the fourth preferred embodiment of the present invention is done by using the pilot symbol, after the weight addition operation using a data sequence to be sent.

A second multiplexer 414 for transmitting path A is input with the multiplication result output by the weight adder 214 and the null symbol or the pilot symbols S1, S2. The multiplexer 414 multiplies the multiplication result by the pilot symbol S1, S2 or the null symbol, and outputs a channel assumption value. A second multiplexer 415 for transmitting path B is input with the multiplication result output by the weight adder 215 and the null symbol or the reversed pilot symbols −S1, −S2. The multiplexer 415 multiplies the multiplication result by the reversed pilot symbol −S1, −S2 or the null symbol, and outputs a channel assumption value.

While the preferred form of the present invention has been described, it is to be understood that modifications will be apparent to those skilled in the art without departing from the spirit of the invention.

The scope of the invention, therefore, is to be determined solely by the following claims.

What is claimed:

1. A method for controlling a mobile communications system, comprising:
    communicating between a mobile station and a first base station, wherein the first base station is operating at a first antenna specific weight factor; and
    transmitting, while the mobile station is in a coverage area of the first base station and a coverage area of a second base station, a control signal from the mobile station to the second base station which causes the second base station to operate at a second antenna specific weight factor which is the same as the first antenna specific weight factor,
    communicating between the mobile station and the second base station, wherein the second base station is operating at the second antenna specific weight factor,
    the first base station generating a first transmission signal and a second transmission signal using the first antenna specific weight factor, and transmitting the first and second transmission signals to the mobile station,
    the mobile station selecting one of the first and second transmission signals according to respective signal qualities thereof, and communicating with the first base station using the selected first or second transmission signal,
    the first base station generating a first calculation result using a data sequence to be sent and a pilot symbol, and generating the first transmission signal using the first calculation result and the first antenna specific weight factor, and
    the first base station generating a second calculation result using the data sequence to be sent and a reversed pilot symbol, and generating the second transmission signal using the second calculation result and the first antenna specific weight factor.

2. The method according to claim 1, wherein the mobile station communicates with the first and second stations in code division multiple access (CDMA).

3. The method according to claim 1, wherein the first base station and the mobile station communicate with each other in code division multiple access (CDMA).

4. The method according to claim 1, further comprising:
    the second base station generating a third transmission signal and a fourth transmission signal using the second antenna specific weight factor, and transmitting the third and fourth transmission signals to the mobile station; and
    the mobile station selecting one of the third and fourth transmission signals according to respective signal qualities thereof, and communicating with the second base station using the selected third or fourth transmission signal.

5. The method according to claim 4, further comprising:
    the second base station generating a third calculation result using a second data sequence to be sent and a second pilot symbol, and generating the third transmission signal using the third calculation result and the second antenna specific weight factor; and
    the second base station generating a fourth calculation result using the second data sequence to be sent and a reversed second pilot symbol, and generating the fourth transmission signal using the fourth calculation result and the second antenna specific weight factor.

6. A method for controlling a handoff operation in a mobile communications system, comprising:
    communicating between a mobile station and a first base station, wherein the first base station is operating at a first antenna specific weight factor;
    transmitting, while the mobile station is in a coverage area of the first base station and a coverage area of a second base station, a control signal from the mobile station to the second base station which causes the second base station to operate at a second antenna specific weight factor which is the same as the first antenna specific weight factor; and
    communicating between the mobile station and the second base station, wherein the second base station is operating at the second antenna specific weight factor,
    the first base station generating a first transmission signal and a second transmission signal using the first antenna specific weight factor, and transmitting the first and second transmission signals to the mobile station,
    the mobile station selecting one of the first and second transmission signals according to respective signal qualities thereof, and communicating with the first base station using the selected first or second transmission signal,
    the second base station generating a third transmission signal and a fourth transmission signal using the second antenna specific weight factor, and transmitting the third and fourth transmission signals to the mobile station,
    the mobile station selecting one of the third and fourth transmission signals according to respective signal qualities thereof, and communicating with the second base station using the selected third or fourth transmission signal,
    the second base station generating a first calculation result using a data sequence to be sent and a first symbol, and generating the third transmission signal using the first calculation result and the second antenna specific weight factor, and
    the second base station generating a second calculation result using the data sequence to be sent and a second symbol, and generating the fourth transmission signal using the second calculation result and the second antenna specific weight factor.

7. The method according to claim 6, wherein the second base station and the mobile station communicate with each other in code division multiple access (CDMA).

8. The method according to claim 6, further comprising:
the second base station receiving a pilot symbol and a null symbol, generating a first calculation result using the data sequence to be sent and either the pilot symbol or the null symbol as the first symbol, and generating the third transmission signal using the first calculation result and the second antenna specific weight factor; and the second base station generating a second calculation result using the data sequence to be sent and a reversed pilot symbol or the null symbol as the second symbol, and generating the fourth transmission signal using the second calculation result and the second antenna specific weight factor.

9. A method for controlling a handoff operation in a mobile communications system, comprising:
communicating between a mobile station and a first base station, wherein the first base station is operating at a first antenna specific weight factor;
transmitting, while the mobile station is in a coverage area of the first base station and a coverage area of a second base station, a control signal from the mobile station to the second base station which causes the second base station to operate at a second antenna specific weight factor which is the same as the first antenna specific weight factor; and
communicating between the mobile station and the second base station, wherein the second base station is operating at the second antenna specific weight factor,
the first base station generating a first transmission signal and a second transmission signal using the first antenna specific weight factor, and transmitting the first and second transmission signals to the mobile station,
the mobile station selecting one of the first and second transmission signals according to respective signal qualities thereof, and communicating with the first base station using the selected first or second transmission signal,
the first base station receiving a pilot signal and a null signal, generating a first calculation result using a data sequence to be sent and the pilot symbol or the null symbol, and generating the first transmission signal using the first calculation result and the first antenna specific weight factor, and
the first base station generating a second calculation result using the data sequence to be sent and a reversed pilot symbol or the null symbol, and generating the second transmission signal using the second calculation result and the first antenna specific weight factor.

10. The method according to claim 9, wherein the first base station and the mobile station communicate with each other in code division multiple access (CDMA).

11. A base station in a mobile communications system, the base station comprising:
a first weight adder which adds a first antenna specific weight factor to a first signal, and which generates a first transmission signal to be received by a mobile station;
a second weight adder which adds the first antenna specific weight factor to a second signal, and which generates a second transmission signal to be received by the mobile station;
a control circuit which sets a value of the first antenna specific weight factor according to a control signal received from the mobile station;
a first calculation circuit which generates the first signal based on a pilot symbol and a data sequence to be sent; and
a second calculation circuit which generates the second signal based on a reversed pilot symbol and the data sequence to be sent.

12. The base station according to claim 11, wherein the first and second calculation circuits are multiplier circuits.

13. The base station according to claim 11, wherein the apparatus further comprises:
a code generator which reverses a sign of the pilot symbol and outputs the pilot symbol to the first calculation circuit and the reversed pilot symbol to the second calculation circuit.

14. A base station in a mobile communications system, the base station comprising:
a first weight adder which adds a first antenna specific weight factor to a first signal, and which generates a first transmission signal to be received by a mobile station;
a second weight adder which adds the first antenna specific weight factor to a second signal, and which generates a second transmission signal to be received by the mobile station;
a control circuit which sets a value of the first antenna specific weight factor according to a control signal received from the mobile station;
a first calculation circuit which receives a pilot symbol and a null symbol, which generates the first signal based on the pilot symbol or the null symbol and a data sequence to be sent; and
a second calculation circuit which generates the second signal based on a reversed pilot symbol or the null symbol and the data sequence to be sent.

15. The base station according to claim 14, wherein the first and second calculation circuits are multiplier circuits.

16. The base station according to claim 14, wherein the apparatus further comprises:
a code generator which reverses a sign of the pilot symbol and outputs the pilot symbol to the first calculation circuit and the reversed pilot symbol to the second calculation circuit.

* * * * *